United States Patent [19]
Yamamura et al.

[11] Patent Number: 5,428,797
[45] Date of Patent: Jun. 27, 1995

[54] CIRCUITRY FOR ELIMINATING BUS CONTENTION AT HIGH FREQUENCIES BY DRIVING A BUS TO AN AVAILABLE STATE PRIOR TO ITS RELINQUISHING CONTROL OF THE BUS

[75] Inventors: Michael Yamamura, Los Gatos; Dean M. Drako, Los Altos, both of Calif.

[73] Assignee: Apple Computer, Inc., Cupertino, Calif.

[21] Appl. No.: 176,308

[22] Filed: Jan. 3, 1994

Related U.S. Application Data

[63] Continuation of Ser. No. 813,156, Dec. 23, 1991, abandoned.

[51] Int. Cl.⁶ .................................. G06F 13/36
[52] U.S. Cl. .................................. 395/725; 395/550; 364/242.92; 364/240; 364/271.6; 364/DIG. 1
[58] Field of Search ............... 395/550, 425, 725, 325; 307/494; 370/85.1, 85.2, 85.3

[56] References Cited
U.S. PATENT DOCUMENTS

| | | | |
|---|---|---|---|
| 4,390,944 | 6/1983 | Quackenbush et al. | 364/200 |
| 4,627,018 | 12/1986 | Trost et al. | 395/725 |
| 4,736,124 | 4/1988 | McFarland, Jr. | 307/471 |
| 5,003,467 | 3/1991 | Donaldson et al. | 395/325 |
| 5,029,076 | 7/1991 | Gruender, Jr. et al. | 395/725 |
| 5,056,110 | 10/1991 | Fu et al. | 375/36 |
| 5,070,449 | 12/1991 | Dawson et al. | 364/900 |
| 5,086,427 | 2/1992 | Whittaker et al. | 370/85.1 |
| 5,109,493 | 4/1992 | Banerjee | 395/325 |
| 5,179,709 | 1/1993 | Bailey et al. | 395/725 |
| 5,191,656 | 3/1993 | Forde, III et al. | 395/325 |
| 5,193,194 | 7/1991 | Stewart et al. | 395/725 |

*Primary Examiner*—Thomas C. Lee
*Assistant Examiner*—Sang Hui Kim
*Attorney, Agent, or Firm*—Blakely, Sokoloff, Taylor & Zafman

[57] ABSTRACT

Apparatus for switching data to a bus including apparatus for driving a bus to a first data receiving condition during a first clock period, apparatus for driving the bus to a second data awaiting condition during a second clock period, apparatus for releasing the bus from the second data awaiting condition during the second clock period, and apparatus for maintaining the bus in the second data awaiting condition.

18 Claims, 3 Drawing Sheets

PRIOR ART

CIRCUITRY FOR ELIMINATING BUS CONTENTION AT HIGH FREQUENCIES BY DRIVING A BUS TO AN AVAILABLE STATE PRIOR TO ITS RELINQUISHING CONTROL OF THE BUS

This is a continuation of application Ser. No. 07/813,156, filed Dec. 23, 1991 now abandoned.

BACKGROUND OF THE INVENTION

1. Field of the Invention

This invention relates to computer circuits and, more particularly, to apparatus for eliminating bus contention at high clock frequencies in circuitry transferring digital data.

2. History of the Prior Art

In a typical computer circuit, a number of components are able to furnish data to a bus. All of these components are connected to the bus through individual switching circuits which allow the components to transfer data to and from the bus. The individual components each signal that they have information to be transferred on the bus, an arbitration operation determines which data is to go first, and the component with that data is connected to the bus through its switching circuitry so that it may transfer its data.

One problem that must be overcome is the tendency of different component circuits to want to drive the bus at the same time. Apart from any other problems, if two different components attempt to drive the bus at the same time, the data provided will almost certainly be incorrect for any purpose. The typical switching circuit which connects a component to a bus includes an output driver which is enabled to transfer data to the bus and turns off in order to release the bus for use by another component. When the bus is released by a component, the bus charges to a condition determined by a voltage (e.g., Vcc) applied through a pull up resistor. The switching circuit is not able to turn on or off instantaneously, and the time to turn on or off varies from device to device. A clock cycle is, therefore, often inserted after one device relinquishes the bus before another device may drive the bus to allow sufficient time for the bus to change state and avoid contention problems due to differences in switching speed. However, during this added cycle the bus is in an unknown state. This is an unacceptable solution in situations in which the system logic needs to drive the bus very rapidly.

SUMMARY OF THE INVENTION

It is, therefore, an object of the present invention to provide circuitry for accurately controlling the state of a computer bus in order to eliminate bus contentions.

It is another more specific object of the present invention to provide circuitry which positively enables and disables an output driver from a circuit so that circuitry connected thereto is positively placed in one or the other of two operative conditions.

These and other objects of the present invention are realized in apparatus for switching data to a bus comprising means for driving a bus to a first data receiving condition during a first clock period, means for driving the bus to a second data awaiting condition during a second clock period, means for releasing the bus from the second data awaiting condition during the second clock period, and means for maintaining the bus in the second data awaiting condition.

These and other objects and features of the invention will be better understood by reference to the detailed description which follows taken together with the drawings in which like elements are referred to by like designations throughout the several views.

DETAILED DESCRIPTION OF THE INVENTION

Figure 1:
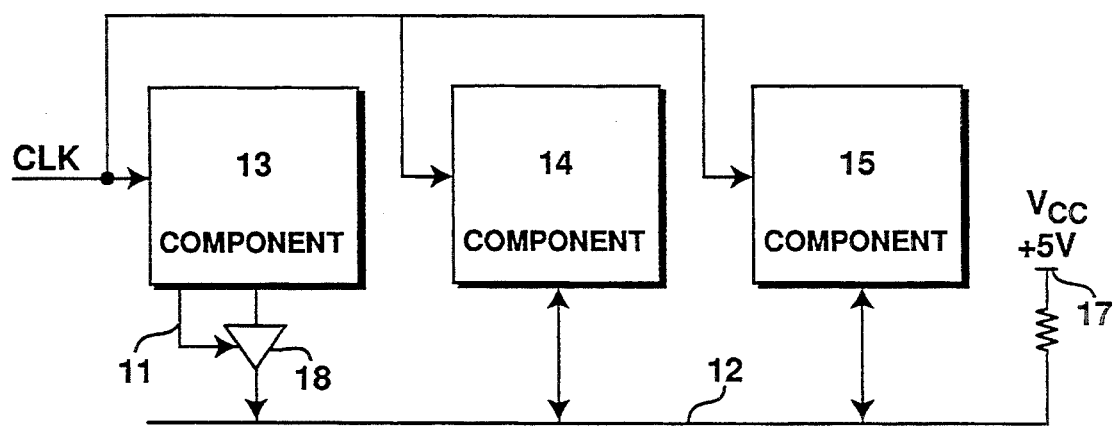
FIG. 1 is a diagram illustrating a circuit typically used in the prior art to eliminate bus contention.

Referring now to FIG. 1 there is illustrated a bus system 10. The system 10 includes a physical bus 12 which may include a number of individual lines upon which binary signals are typically placed for transmission. Connected to the bus 12 are three individual components 13, 14, and 15 each of which may furnish data to the bus. Although each of the components is connected to the bus 12 through a switching arrangement, the switching arrangements operate in the same manner so only the switching arrangement of the components 13 is illustrated in any detail. As may be seen, the component 13 is joined to the bus 12 by a switching arrangement which is a driver circuit 16.

Prior to any component driving data on the bus 12, the bus 12 is held at a high voltage level by a voltage source 17. Data is furnished to the output of the circuit 13 from a source of data within the circuit 13. An enable signal is applied to the driver circuit 16 by a conductor 11 when the data is to be driven on the bus 12. This places a low voltage on the bus. When the data has been transferred on the bus 12 and the circuit 13 is ready to relinquish the bus 12, the enable signal is removed; and the driver circuit 16 turns off. This allows the bus 12 to float toward the value of voltage furnished by the source 17. The transition time from the low voltage to the high voltage depends on the resistance and capacitance values of the circuitry connected to the bus but is typically less than one clock period. A dead cycle of one clock period is typically interposed between the time one component relinquishes the bus and another component drives the bus so that both circuits will not be attempting to drive the bus at the same time.

Figure 2:
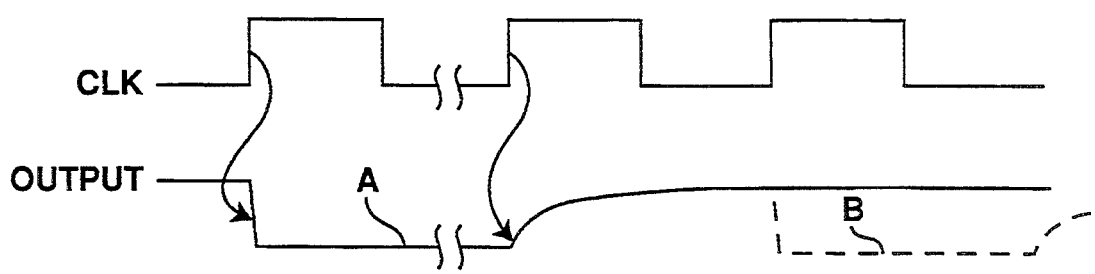
FIG. 2 is a timing diagram illustrating the operation of the circuit of FIG. 1.

FIG. 2 illustrates the system clock signal which is typically used to time the output enable signal and the value at the output terminal of the driver circuit. As may be seen in the example, the clock signal going high is used to initiate the transfer of data by the driver circuit. After some period of time, the clock signal again going high terminates the output enable signal applied to the driver. This allows the bus 12 connected at the output of the driver circuit 16 to float toward the value of the source 17. This transition to the high voltage state typically takes something less than one clock cycle so that a second component 14 can drive the bus 12 at the time the next clock signal goes high.

In order to determine whether the bus is free, the value on the bus is sampled by the components interested in using the bus (e.g., bus masters). Because of the speed of operation necessary at advanced clock frequencies (40 megahertz), the bus may in fact be at a level anywhere between the high and low values illustrated in FIG. 2 at the time of the sampling. If the component 14 attempts to sample the bus to determine whether it may drive data on the bus, the value on the bus may be in an indeterminate state so that another clock period of delay must occur before the component 14 may access the bus.

Figure 3:
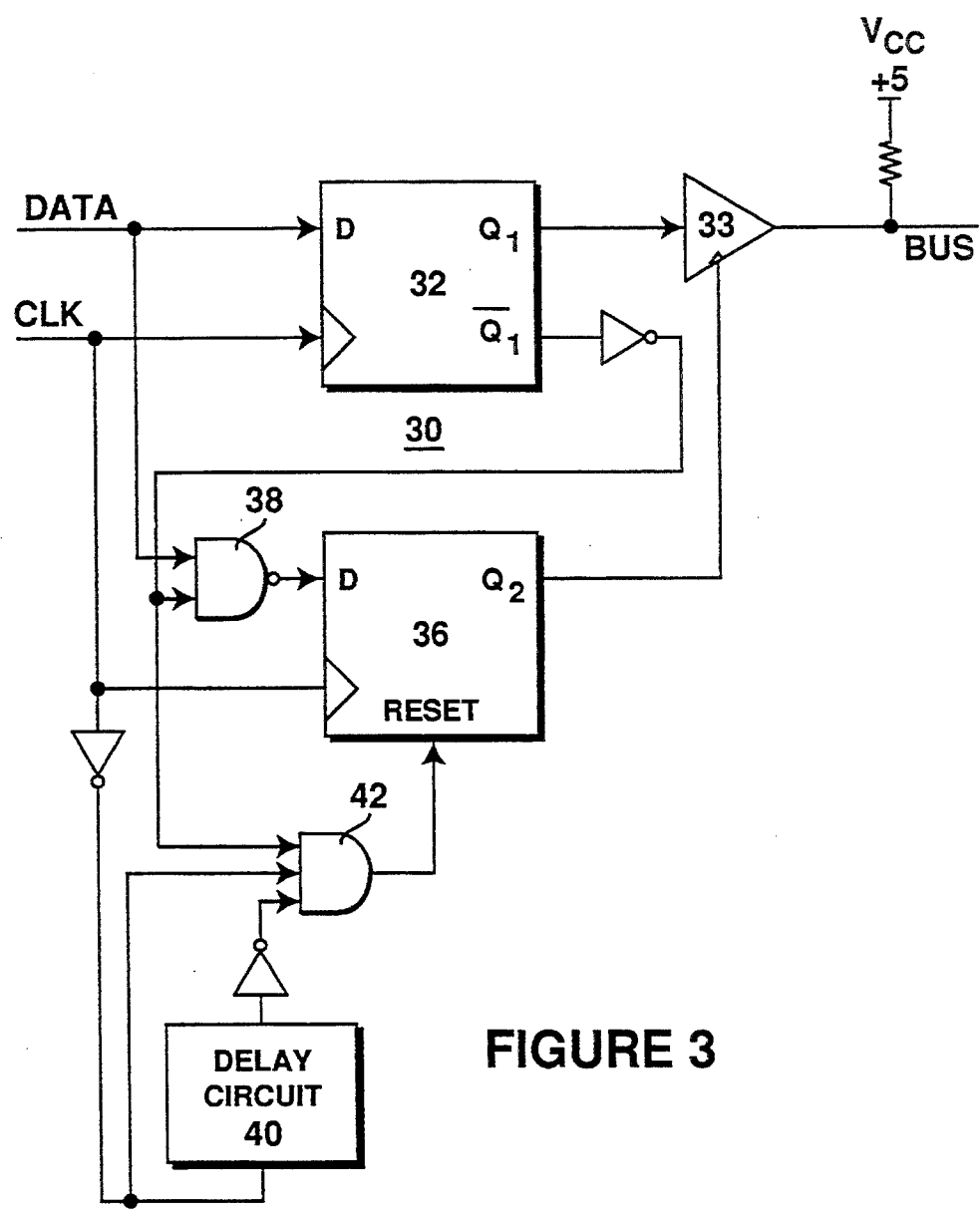
FIG. 3 is a block diagram of a circuit designed in accordance with the present invention.

To resolve this problem, circuitry in accordance with the present invention has been designed. This circuitry is adapted to cause the driver circuitry to not only drive the bus negative when data is driven onto the bus, but to drive the bus positive before the bus is relinquished. By so doing, the circuitry places the bus in the positive condition it would otherwise reach after the driver turns off and creates a positive dead cycle which always occurs at the appropriate time even with very high clock frequencies. Such circuitry 30 is illustrated in FIG. 3. The circuit 30 illustrated in FIG. 3 may be one of thirty-three individual circuits thirty-two of which are each adapted to provide one bit of information to a thirty-two bit bus. The thirty-third circuit 30 which is discussed here is utilized to transfer signals to the bus used in the arbitration for the bus. Since only the circuit used for arbitration is important to the invention, only that circuit is discussed in detail in this specification.

Figure 4:
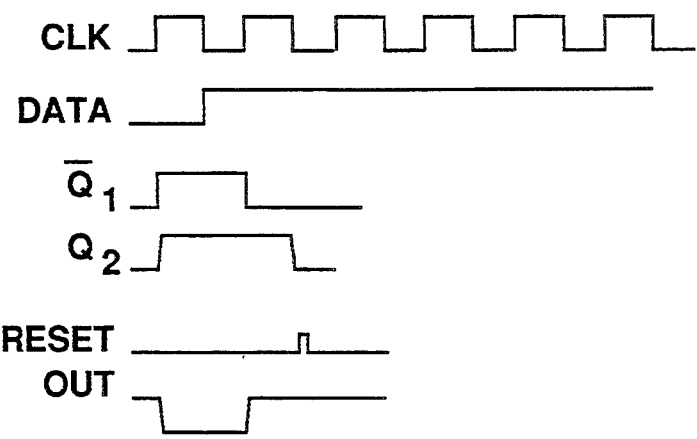
FIG. 4 is a timing diagram illustrating the operation of the circuit of FIG. 3.

The circuit 30 includes a first D flip-flop 32. When data is to be transferred to the bus, a low value is placed by the component at the D input to the flip-flop 32 and appears at an output terminal Q when the flip-flop 32 is enabled. The system clock signal is applied to enable the flip-flop 32. Thus, this low value on the data line is transferred to the Q terminal of the flip-flop 32 beginning when the clock signal goes high. The state of the data line continues to be transferred during the entire clock period. FIG. 4 is a timing diagram illustrating this.

The value on the data line is furnished to a driver circuit 33 having a controlling enable terminal. When the enable terminal is high, the low value on the data line is transferred. As may be seen, the output terminal of the driver circuit 33 is connected to Vcc through a pull-up resistor 35. The enabling signal is applied to the circuit 33 through a second flip-flop 36. The flip-flop 36 receives input at a D terminal through a NAND gate 38. The NAND gate 38 receives the inverted output of the flip-flop 32 ($Q_1$ bar, note: bar is used throughout this specification to indicate a logical complement) and the data input. When either the data line or the output of the flip-flop 32 is low, a high input is furnished the flip-flop 36. The clock signal enables the flip-flop 36 so that a high output is produced at the $Q_2$ terminal essentially at the same instant the clock signal enables the flip-flop 32 to transfer the value on the data line. This output enables the driver circuit 33 allowing it to transfer value on the data line to its output terminal and drive the bus low off the leading edge of the clock signal.

When the clock signal goes high and the data line has also gone high signifying the component is relinquishing the bus, the high value at the D input causes a low value to be provided from the $Q_1$ bar output of the flip-flop 32. This value is inverted at the input D to the flip-flop 36 by the NAND gate 38, and passed to the $Q_2$ terminal. This signal continues to enable the circuit 33. Thus, the driver circuit 33 continues to transfer the value on the D input of the flip-flop 32 so that the output of the driver circuit 33 which has been driven low during data transfer is driven high by the release of the bus by that component. This places the bus in the high condition so that if another component is ready to drive data on the bus, the bus is at the correct high value. However, the component connected to the flip-flop 32 is still driving the bus.

To terminate the operation of the driver circuit 33 and free the bus, the clock signal is inverted and furnished to a delay circuit 40. The circuit 40 is adapted to produce approximately one-half of a clock period of delay. This delay may be fairly precisely controlled by the use of industry standard delay lines such as the Motorola Delay 8 Macro Library Cell. Then the output of circuit 40 is inverted and furnished to an AND gate 42. Thus, the inverted output of the circuit 40 goes high approximately one-half a clock period after the clock signal goes high. This amounts to a half clock period delay of the clock signal to the AND gate 42. The AND gate 42 also receives the inverted $Q_1$ bar signal from the flip-flop 32 and the clock bar signal as input signals. When the clock signal goes negative after the bus has been driven positive, clock bar goes positive. The inverted $Q_1$ bar signal is high after the D terminal of flip-flop 32 goes high. These three signals coincide during the short period of overlap between the inverted clock signal and the delayed clock signal to produce a short positive pulse at the output of the AND gate 42. This occurs approximately one-half a clock period after the clock signal goes high and is approximately the width of the delay caused by circuit 40. The pulse resets the flip-flop 36 causing the driver circuit 33 to turn off so that its output no longer drives the bus. This releases the bus from the component connected to the driver 33 while the bus is in the correct high state so that it may be immediately driven by another component. The pulse produced to reset the driver 33 may also be used to reset the drivers of all of the thirty-two circuits which drive individual bits of data onto the lines of the bus so that the bus may be immediately driven by another component.

Figure 5:
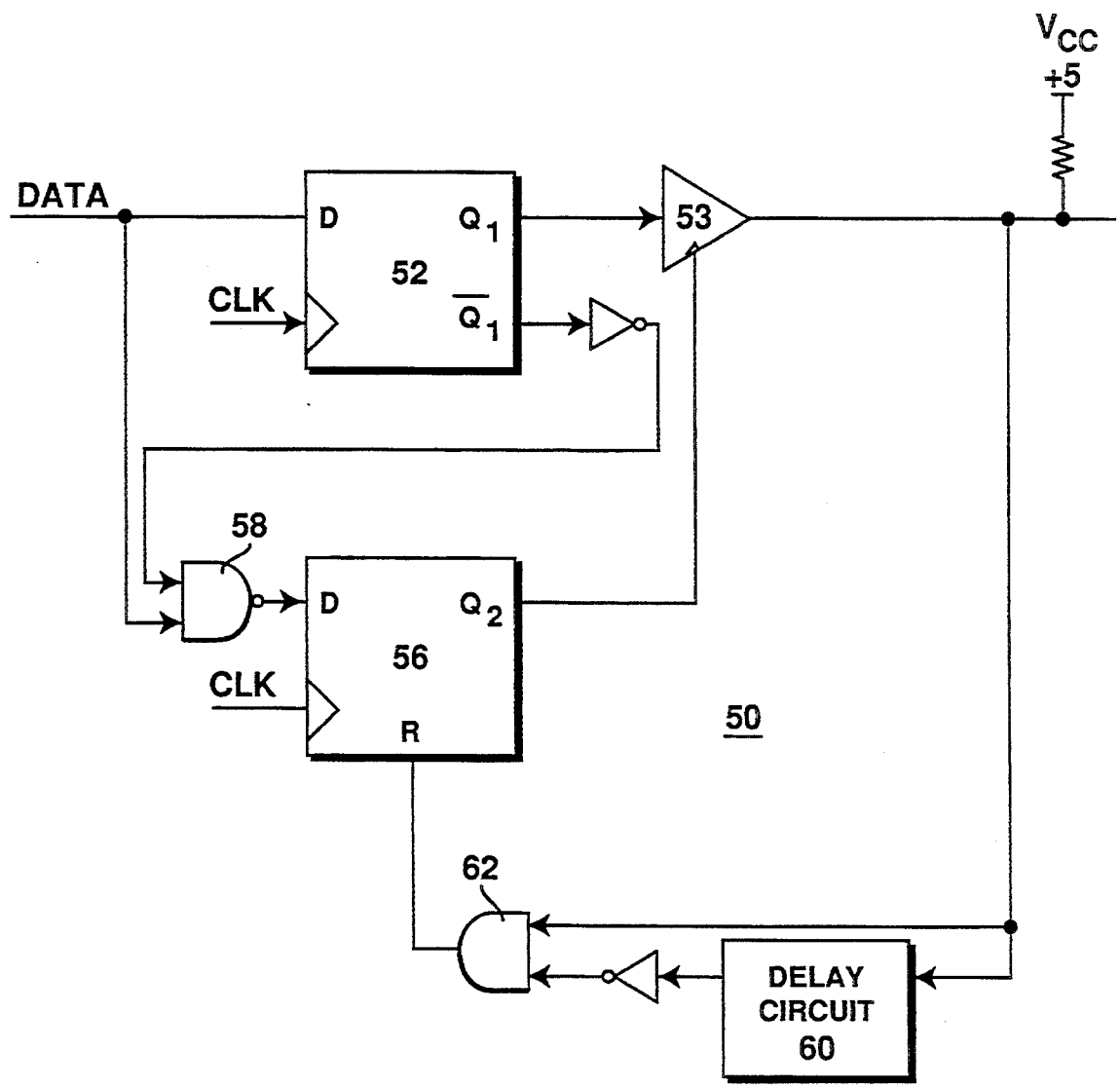
FIG. 5 is a block diagram of another circuit designed in accordance with the present invention.

FIG. 5 is a block diagram of another circuit 50 constructed in accordance with the present invention which provides the appropriate output by which the bus is driven positive and then released. The circuit 50 includes a first flip-flop 52 which receives the value on the data line from the component and transfers output from a $Q_1$ terminal to a driver circuit 53. The $Q_1$ bar output of the flip-flop 52 and the value on the data line are also furnished to a NAND gate 58 which is connected to the D terminal of a second flip-flop 56. The $Q_2$ terminal of the flip-flop 56 is used to enable the driver circuit 53.

The two flip-flops 52 and 56 operate just as do the flip-flops 32 and 36 of the circuit of FIG. 3 to enable the driver circuit 53 when the data line goes negative and continuing through the beginning of the clock cycle when the data line goes positive. In this manner, the bus is driven negative when data becomes available and is then driven positive when the bus is released.

In a similar manner, a NAND gate 62 receives the positive output of the driver circuit 53 when the bus is driven positive and ANDs this with a delayed and inverted negative signal from the low condition of the driver circuit 53. The NAND gate provides a reset pulse to the driver 53 to turn the driver 53 off and release the bus for use by another component. The circuit 50 does not encounter the problem of a race condition (which the circuit 30 may with slow driver circuits 33) where the bus is not yet at the positive state when the driver is disabled. The circuit 50 relies on the actual positive output to trigger the reset pulse so the bus must be in the positive state before the reset occurs. Consequently, the circuit 50 may more accurately control the driver output. It does this by guaranteeing that the driver output has switched to a high level before the flip-flop 56 is reset to disable the driver 53.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A computer system comprising:
    a bus including at least one conductor for indicating whether the bus is available to be used to transfer data, the conductor being biased to a first voltage level when the bus is available; and
    a plurality of components for controlling the bus to transfer data, each component generating a data signal having an active and an inactive level, the active level of the data signal indicating that the component is to drive the bus and the inactive level of the data signal indicating that the component is to relinquish control of the bus, at least one of said components further comprising:
    a driver circuit coupled to the conductor, the driver circuit driving the conductor to a second voltage level in response to the data signal being active such that the conductor indicates that the bus is not available, and the driver circuit automatically driving the conductor to the first voltage level in response to the data signal being inactive before the component relinquishes control of the bus such that the conductor quickly indicates that the bus is available when the component relinquishes control of the bus, wherein the driver circuit comprises:
        a first circuit coupled to receive the data signal, the first circuit outputting a first signal in response to the data signal such that the first signal has the second voltage level when the data signal is active and the first voltage level when the data signal is inactive;
        a second circuit coupled to receive the data signal and coupled to the first circuit, the second circuit generating an enable signal having an active and an inactive level, the enable signal going active in response to the data signal becoming active;
        a driver coupled to receive the first signal, the enable signal, and coupled to the conductor, the driver driving the first signal on the conductor when the enable signal is active; and
        a third circuit coupled to the second circuit and coupled to receive the data signal, the third circuit generating an active reset signal for resetting the second circuit such that the enable signal goes inactive after the driver has driven the conductor to the first voltage level in response to the data signal being inactive.

2. The computer system of claim 1, wherein the first circuit comprises a flip-flop circuit coupled to the data signal and a clock signal, the flip-flop circuit having an output for outputting the first signal and an inverted output for outputting an inverted first signal.

3. The computer system of claim 2, wherein the second circuit comprises:
    a first inverter coupled to receive the inverted first signal, the first inverter generating a twice inverted first signal;
    a first logic circuit coupled to receive the data signal and the twice inverted first signal, the first logic circuit generating an input signal having an active level and an inactive level, the input signal being inactive only when both the data signal and the twice inverted first signal are active.
    a second flip-flop circuit coupled to receive the clock signal and the input signal, the second flip-flop circuit generating the enable signal in response to the clock signal and the input signal, the enable signal going active when the first signal is active and the clock signal activates the second flip-flop circuit.

4. The computer system of claim 3, wherein the first and second flip-flop circuits are activated by a rising edge of the clock signal.

5. The computer system of claim 4, wherein the third circuit comprises:
    a second inverter coupled to receive the clock signal, the second inverter generating an inverted clock signal;
    a delay circuit coupled to receive the inverted clock signal, the delay circuit generating a delayed inverted clock signal;
    a third inverter coupled to receive the delayed inverted clock signal, the third inverter generating a delayed twice inverted clock signal;
    a second logic circuit coupled to receive the inverted clock signal, the delayed twice inverted clock signal, the twice inverted first signal, and coupled to the second flip-flop circuit, the second logic circuit generating the active reset signal for resetting the second flip-flop circuit during a period following a failing edge of the clock signal when the inverted clock signal, the delayed twice inverted clock signal, and the twice inverted first signal are each active.

6. The computer system of claim 4, wherein the third circuit comprises:
    a delay circuit coupled to receive the first signal, the delay circuit generating a delayed inverted first signal;
    a second inverter coupled to receive the delayed inverted first signal, the second inverter generating a delayed inverted first signal;
    a second logic circuit coupled to receive the first signal, the delayed inverted first signal, and coupled to the second flip-flop circuit, the second logic circuit generating the active reset signal for resetting the second flip-flop circuit during a period following a falling edge of the clock signal when the first signal and the delayed inverted first signal are both active.

7. A computer system comprising:
    a bus including at least one conductor for indicating whether the bus is available to be used to transfer data, the conductor being biased to a first voltage level when the bus is available; and
    a plurality of components for controlling the bus to transfer data, each component generating a data signal having an active and an inactive level, the active level of the data signal indicating that the component is to drive the bus and the inactive level of the data signal indicating that the component is to relinquish control of the bus, each of said components further comprising:

a driver circuit coupled to the conductor, the driver circuit driving the conductor to a second voltage level in response to the data signal being active such that the conductor indicates that the bus is not free, the driver circuit automatically driving the conductor to the first voltage level in response to the data signal being inactive before the component relinquishes control of the bus such that the conductor immediately indicates that the bus is free when the component relinquishes control of the bus, wherein the driver circuit comprises:

a first circuit coupled to receive the data signal, the first circuit outputting a first signal in response to the data signal such that the first signal has the second voltage level when the data signal is active and the first voltage level when the data signal is inactive;

a second circuit coupled to receive the data signal and coupled to the first circuit, the second circuit generating an enable signal having an active and an inactive level, the enable signal going active in response to the data signal becoming active;

a driver coupled to receive the first signal, the enable signal, and coupled to the conductor, the driver driving the first signal on the conductor when the enable signal is active; and a third circuit coupled to the second circuit and coupled to receive the data signal, the third circuit generating an active reset signal for resetting the second circuit such that the enable signal goes inactive after the driver has driven the conductor to the first voltage level in response to the data signal being inactive.

8. The computer system of claim 7, wherein the first circuit comprises a flip-flop circuit coupled to the data signal and a clock signal, the flip-flop circuit having an output for outputting the first signal and an inverted output for outputting an inverted first signal.

9. The computer system of claim 8, wherein the second circuit comprises:

a first inverter coupled to receive the inverted first signal, the first inverter generating a twice inverted first signal;

a first logic circuit coupled to receive the data signal and the twice inverted first signal, the first logic circuit generating an input signal having an active level and an inactive level, the input signal being inactive only when both the data signal and the twice inverted first signal are active.

a second flip-flop circuit coupled to receive the clock signal and the input signal, the second flip-flop circuit generating the enable signal in response to the clock signal and the input signal, the enable signal going active when the first signal is active and the clock signal activates the second flip-flop circuit.

10. The computer system of claim 9, wherein the first and second flip-flop circuits are activated by a rising edge of the clock signal.

11. The computer system of claim 10, wherein the third circuit comprises:

a second inverter coupled to receive the clock signal, the second inverter generating an inverted clock signal;

a delay circuit coupled to receive the inverted clock signal, the delay circuit generating a delayed inverted clock signal;

a third inverter coupled to receive the delayed inverted clock signal, the third inverter generating a delayed twice inverted clock signal;

a second logic circuit coupled to receive the inverted clock signal, the delayed twice inverted clock signal, the twice inverted first signal, and coupled to the second flip-flop circuit, the second logic circuit generating the active reset signal for resetting the second flip-flop circuit during a period following a falling edge of the clock signal when the inverted clock signal, the delayed twice inverted clock signal, and the twice inverted first signal are each active.

12. The computer system of claim 10, wherein the third circuit comprises:

a delay circuit coupled to receive the first signal, the delay circuit generating a delayed inverted first signal;

a second inverter coupled to receive the delayed inverted first signal, the second inverter generating a delayed inverted first signal;

a second logic circuit coupled to receive the first signal, the delayed inverted first signal, and coupled to the second flip-flop circuit, the second logic circuit generating the active reset signal for resetting the second flip-flop circuit during a period following a falling edge of the clock signal when the first signal and the delayed inverted first signal are both active.

13. In a computer system having a bus and a plurality of components for controlling the bus, wherein the bus includes at least one conductor for indicating whether the bus is available to be used to transfer data, the conductor being biased to a first voltage level when the bus is available, each component generating a data signal having an active and an inactive level, the active level of the data signal indicating that the component is to drive the bus and the inactive level of the data signal indicating that the component is to relinquish control of the bus, a driver circuit comprising:

a first circuit coupled to receive the data signal of a first component, the first circuit outputting a first signal in response to the data signal such that the first signal has a second voltage level when the data signal is active and a first voltage level when the data signal is inactive;

a second circuit coupled to receive the data signal and coupled to the first circuit, the second circuit generating an enable signal having an active and an inactive level, the enable signal going active in response to the data signal becoming active;

a driver coupled to the first signal, enable signal, and the conductor, the driver driving the first signal on the conductor when the enable signal goes active;

a third circuit coupled to the second circuit and coupled to receive the data signal, the third circuit generating an active reset signal for resetting the second circuit such that the enable signal goes inactive after the driver has driven the conductor to the first voltage level in response to the data signal being inactive.

14. The driver circuit of claim 13, wherein the first circuit comprises a flip-flop circuit coupled to the data signal and a clock signal, the flip-flop circuit having an output for outputting the first signal and an inverted output for outputting an inverted first signal.

15. The driver circuit of claim 14, wherein the second circuit comprises:
- a first inverter coupled to receive the inverted first signal, the first inverter generating a twice inverted first signal;
- a first logic circuit coupled to receive the data signal and the twice inverted first signal, the first logic circuit generating an input signal having an active level and an inactive level, the input signal being inactive only when both the data signal and the twice inverted first signal are active.
- a second flip-flop circuit coupled to receive the clock signal and the input signal, the second flip-flop circuit generating the enable signal in response to the clock signal and the input signal, the enable signal going active when the first signal is active and the clock signal activates the second flip-flop circuit.

16. The driver circuit of claim 15, wherein the first and second flip-flop circuits are activated by a rising edge of the clock signal.

17. The driver circuit of claim 16, wherein the third circuit comprises:
- a second inverter coupled to receive the clock signal, the second inverter generating an inverted clock signal;
- a delay circuit coupled to receive the inverted clock signal, the second inverter generating a delayed inverted clock signal;
- a third inverter coupled to receive the delayed inverted clock signal, the third inverter generating a delayed twice inverted clock signal;
- a second logic circuit coupled to receive the inverted clock signal, the delayed twice inverted clock signal, the twice inverted first signal, and coupled to the second flip-flop circuit, the second logic circuit generating the active reset signal for resetting the second flip-flop circuit during a period following a falling edge of the clock signal when the inverted clock signal, the delayed twice inverted clock signal, and the twice inverted first signal are each active.

18. The driver circuit of claim 16, wherein the reset circuit comprises:
- a delay circuit coupled to receive the first signal, the delay circuit generating a delayed inverted first signal;
- a second inverter coupled to receive the delayed inverted first signal, the second inverter generating a delayed inverted first signal;
- a second logic circuit coupled to receive the first signal, the delayed inverted first signal, and coupled to the second flip-flop circuit, the second logic circuit generating the active reset signal for resetting the second flip-flop circuit during a period following a falling edge of the clock signal when the first signal and the delayed inverted first signal are both active.

* * * * *

UNITED STATES PATENT AND TRADEMARK OFFICE
CERTIFICATE OF CORRECTION

PATENT NO.   :   5,428,797
DATED        :   June 27, 1995
INVENTOR(S)  :   Yamamura et al.

It is certified that error appears in the above-identified patent and that said Letters Patent is hereby corrected as shown below:

In column 6 at line 41 delete "failing" and insert --falling--

Signed and Sealed this

Sixteenth Day of December, 1997

Attest:

BRUCE LEHMAN

Attesting Officer          Commissioner of Patents and Trademarks